United States Patent
Cox et al.

(10) Patent No.: US 8,386,111 B2
(45) Date of Patent: Feb. 26, 2013

(54) AUTOMATIC VEHICLE GUIDANCE PROTECTION SYSTEM

(75) Inventors: Paul Cox, Bristol (GB); Mervyn Lear, Bristol (GB); Torquil Ross-Martin, Somerset (GB); Keith Edwards, Hope Valley (GB)

(73) Assignee: Advanced Transport Systems Ltd. (GB)

( * ) Notice: Subject to any disclaimer, the term of this patent is extended or adjusted under 35 U.S.C. 154(b) by 191 days.

(21) Appl. No.: 12/668,295

(22) PCT Filed: Jul. 10, 2007

(86) PCT No.: PCT/GB2007/002580
§ 371 (c)(1),
(2), (4) Date: Aug. 13, 2010

(87) PCT Pub. No.: WO2009/007666
PCT Pub. Date: Jan. 15, 2009

(65) Prior Publication Data
US 2010/0300788 A1 Dec. 2, 2010

(51) Int. Cl.
*G01C 22/00* (2006.01)
(52) U.S. Cl. .......................... 701/23; 180/167
(58) Field of Classification Search ............ 701/23; 180/167
See application file for complete search history.

(56) References Cited

U.S. PATENT DOCUMENTS

| | | | | |
|---|---|---|---|---|
| 3,734,229 A | * | 5/1973 | Comer | 180/168 |
| 3,888,437 A | * | 6/1975 | Birkin | 246/63 A |
| 4,046,342 A | | 9/1977 | Buzzard | |
| 4,215,759 A | * | 8/1980 | Diaz | 180/168 |
| 4,361,202 A | * | 11/1982 | Minovitch | 180/168 |
| 4,464,659 A | * | 8/1984 | Bergqvist | 340/12.27 |
| 4,471,356 A | | 9/1984 | Gidl | |
| 4,697,179 A | * | 9/1987 | Arimitsu et al. | 340/13.24 |
| 5,187,664 A | | 2/1993 | Yardley et al. | |
| 5,938,705 A | * | 8/1999 | Zyburt et al. | 701/24 |
| 6,421,600 B1 | * | 7/2002 | Ross | 701/117 |

FOREIGN PATENT DOCUMENTS

| | | |
|---|---|---|
| DE | 2402932 A1 | 7/1975 |
| EP | 0328796 A2 | 8/1989 |
| EP | 0330639 A2 | 8/1989 |
| EP | 0375553 A1 | 6/1990 |
| GB | 1311027 A | 3/1973 |
| JP | 57048108 | 3/1982 |
| JP | 2002-160632 A | 6/2002 |
| JP | 2006-056420 A | 3/2006 |

OTHER PUBLICATIONS

English abstract provided for JP2006-056420.
English abstract provided for JP2002-160632.
International Preliminary Report on Patentability/Written opinion of the International Searching Authority, Dated Jan. 12, 2010; International Application No. PCT/GB2007/0025800, May 17, 2006.
English abstract for JP-57048108, Mar. 19, 1982.
Search Report for GB0600387.5, May 17, 2006.
English abstract provided for EP-0375553, Jun. 27, 1990.

* cited by examiner

*Primary Examiner* — Mary Cheung
*Assistant Examiner* — Truc M Do
(74) *Attorney, Agent, or Firm* — Rader, Fishman & Grauer PLLC (57) ABSTRACT

An automated vehicle protection system is provided comprising a guideway (20), a vehicle (10), a guideway loop antenna (21), and transponders (41a, 41b), mounted on the vehicle (10). Means (24, 25) are provided, couple to the guideway loop antenna (21), for receiving a signal from the vehicle (10) and generating an inhibit signal in order to inhibit vehicle movement in a section of the guideway (20). The inhibit signal may be passed to a circuit associated with another guideway loop antenna (22, 23) to control transmission of a signal from this other guideway loop antenna (22, 23).

11 Claims, 6 Drawing Sheets

Figure. 4  Normal Operation - No Vehicle Present

Figure. 5    Normal Operation - Vehicle Present

Figure. 6

AUTOMATIC VEHICLE GUIDANCE PROTECTION SYSTEM

CROSS-REFERENCE TO RELATED APPLICATION

This application is a U.S. national phase of International application PCT/GB2007/002580 filed Jul. 10, 2007, which is hereby incorporated by reference in its entirety.

A need has been identified to provide effective and sustainable transport that is both environmentally friendly, quiet and efficient. Currently this need has been addressed by increasing use of public transport networks such as rail and bus which offer improvements in terms of pollution and efficiency over individual means of transport such as cars. These public transport networks have a major drawback in that they often require a large investment in infrastructure, run to a strict time-table and times of operation are governed by working hours of staff. In order to further improve the efficiency of these networks research has been conducted into automated transport networks that are able to operate 24 hours a day, are available for use by passengers at very short notice and, most crucially, do not require a driver.

Automated vehicle guidance can be used in a passenger transport system to provide passengers with direct point-to-point transportation. An automated guided vehicle is a vehicle that replaces a driver with some form of electronic intelligence allowing the vehicle to be operated by computer logic. Presently there are many forms of automated vehicle transport systems in operation across the world and although different, all work on a similar principle. The desired route is defined and sensors are put in place that allow the automated vehicle to follow this route. The defined route is delineated in any of a number of ways that include following rails or magnetic loops placed in the ground, following white lines painted on a surface, sonar location, or comparing GPS and real time position data to name but a few. The path of the route can also take a number of forms being either a linear path upon which a vehicle travels back and forth or a loop of varying dimensions around which the vehicle can travel. Often multiple loops may be inter-connected in order to form a network allowing passage and travel around one loop from another.

The vehicles themselves may use many different methods to provide traction along the guiding medium depending on the nature of the guidance medium itself; steel wheels in the case of rail guidance for example, rubber wheels perhaps if the guiding means is placed below a road which the vehicle is tracking along, or even an electromagnetic cushion in the case of some Maglev trains.

The necessary combination of guidance means, method for providing traction and means for sensing and responding to the guidance can take many forms and are governed by factors of economy, technology and geography.

As is known in the art, an important feature of an autonomous guided vehicle is its absolute safety requirement; for example, vehicles must be prevented from colliding with other vehicles on the route whether the vehicles are sharing the whole of the route or just a portion common to both in the case of networks involving many interlocking routes. In each case, to avoid collision between vehicles it is necessary to know their location either relative to each other or to some other known reference point on the route and if, depending on suitably processed position data, a collision appears imminent then to apply some action to the vehicles to avoid the collision.

EP-A2-0330639 describes an automated guided vehicle (AGV) system in which a passive closed antenna loop is provided adjacent to the vehicle path, along a length of the path and in which a transmitter on the vehicle induces an electromagnetic signal in the antenna loop. A signal induced in the antenna loop by a first vehicle is picked up by a receiver of a second vehicle when the second vehicle is in proximity to the antenna loop. Receipt of the signal at the second vehicle causes it to be slowed or stopped. The signal transmitted has a carrier frequency of 73.5-76.5 kHz modulated at one of several key frequencies (1690 Hz, 1090 Hz, 725 Hz, or 485 Hz). If a vehicle detects any of these key frequencies other than its own key frequency, this is interpreted as meaning that there is another vehicle in the vicinity and the receiving vehicle must stop. No account is taken of and no provision made for whether the other vehicle is upstream (i.e. following) or downstream (i.e. ahead of) the present vehicle. Presumably two such vehicles in the same vicinity will thus cause mutual stopping, and an operator is required to remove the impasse.

There is a need for an improved automated guided vehicle control system, preferably having minimal trackside electronics.

SUMMARY OF THE INVENTION

In accordance with a first aspect of the invention, an automated vehicle protection system is provided comprising: a guideway for guiding a vehicle along a path; a vehicle to be guided along the path; a first guideway loop antenna for transmitting and receiving signals to and from the vehicle; and a transponder mounted on the vehicle for receiving a signal from the guideway loop antenna and transmitting a response to the guideway loop antenna.

Means are preferably provided, coupled to the first guideway loop antenna, for causing the antenna to transmit a sinusoidal radio frequency signal.

Means are preferably provided in the vehicle for receiving a sinusoidal radiofrequency signal from the first guideway loop antenna and automatically transmitting a response thereto.

Means are preferably provided coupled to the first guideway loop antenna for receiving a signal from the vehicle and selectively generating an inhibit signal in response thereto, to inhibit vehicle movement in a section of the guideway. The inhibit signal may be passed to a circuit associated with a second guideway loop antenna to control transmission of a signal from the second guideway loop antenna.

The first and second guideway loop antennae are preferably elongate and extend along first and second adjacent sections of the guideway.

In accordance with a second aspect of the invention, a vehicle is provided comprising a transponder for receiving a signal from a guideway loop antenna and responding thereto.

Code transmit means may be provided, associated with the guideway loop antenna, for selectively transmitting a code to the vehicle depending on the presence or absence of an inhibit signal from an adjacent guideway section. The vehicle may have code receiving means for receiving a code from a guideway loop antenna and control means to cause the vehicle to move along its guideway dependent on a code received.

In accordance with a third aspect of the invention, an automated vehicle protection system is provided comprising: a guideway for guiding a vehicle along a path; a first guideway loop antenna for transmitting and receiving signals to and from the vehicle; and means coupled to the first guideway loop antenna for receiving a signal from the vehicle generated by the vehicle in response to a signal transmitted by the first guideway loop antenna and generating an inhibit signal in response thereto, to inhibit vehicle movement in a section of the guideway.

The inhibit signal may be passed to a circuit associated with a second guideway loop antenna to control transmission of a signal from the second guideway loop antenna.

The first and second guideway loop antennae are preferably elongate and extend along first and second adjacent sections of the guideway.

Code transmit means may be provided, associated with the guideway loop antenna, for selectively transmitting a code to the vehicle depending on the presence or absence of an inhibit signal from an adjacent guideway section.

A preferred embodiment of the invention will now be described, by way of example only, with reference to the following drawings

DETAILED DESCRIPTION

Figure 1:
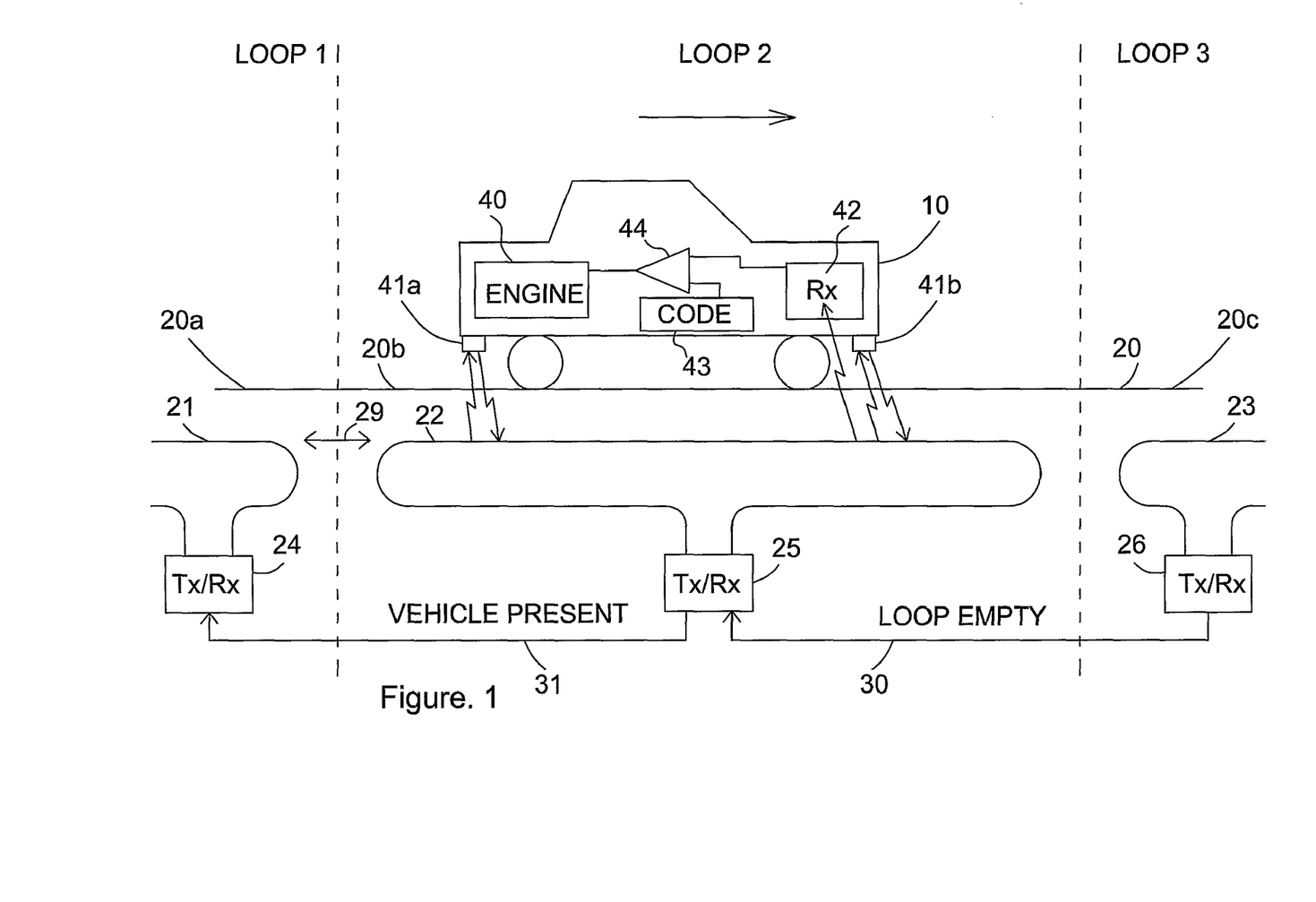
FIG. 1 is a sporadic illustration of an AGV system in accordance with an embodiment of the invention.

FIG. 1 illustrates a vehicle 10 being guided along a guideway 20, which is preferably a concrete guideway with a U-shaped cross section. The guideway is divided into blocks of about 12.5 meters in length. The blocks need not be of the same length. Each of the loops 20a, 20b and 20c has a minimum length of about 2.5 meters and a maximum length of about 16 meters. The width of a guideway loop is about 0.3 meters. There are end-to-end gaps 29 of about 0.2 meters between adjacent loops.

FIG. 1 illustrates three such blocks 20a, 20b and 20c. Each block has a single loop coil embedded in the concrete below or adjacent to the guideway. (A single loop coil is selected for ease of manufacture. A multi-turn coil could be used.) Three such coils 21, 22 and 23 are illustrated. Each coil has a respective transmitter and receiver with associated processing electronic circuitry. Three such transceivers 24, 25 and 26 are illustrated, connected to coils 21, 22 and 23 respectively. As illustrated, block 20 is downstream of the moving vehicle 10 and block 20a is upstream, with block 20b being the current block in which the vehicle is passing. The respective transceivers have signal lines passing therebetween. In particular, each upstream receiver has a signal line for passing a "loop empty" signal to a downstream transceiver. Thus transceiver 26 has a signal line 30 passing to transceiver 25, and transceiver 25 has a signal line 31 passing to transceiver 24. These lines may be capable of two-way communication for two-way vehicle movements.

The vehicle 10 has an engine and associated control circuitry 40. It also has: a pair of resonant (inductive/capacitive) LC circuits or "transponders" 41a and 41b, an FSK receiver 42, a code memory 43, and a comparator 44. The comparator 44 is coupled to the engine and its control circuitry 40.

Each guideway transceiver has a programmable integrated circuit (PIC) microcontroller signal generator and detector. Each is capable of generating a low frequency electromagnetic burst of simple 45 kHz sinusoidal signal. This is amplified using an RF power amplifier to a signal of about 0.1 amp to about 1 amp (preferably at the upper end of this range) and is transmitted into the loop (e.g. from transmitter 25 to loop 22). Two vehicle-mounted LC resonant transponders 41a and 41b (available from Redcliffe Ltd. of 16-20 Clothier Road, Brislington, Bristol, UK) are provided, each comprising a ferrite core with a number of turns of wire in parallel with a capacitor. They reflect signals from the loop 22. The provision of two such vehicle-based transponders provides redundancy and also serves to span the gaps 29 between adjacent loops.

Figure 2:
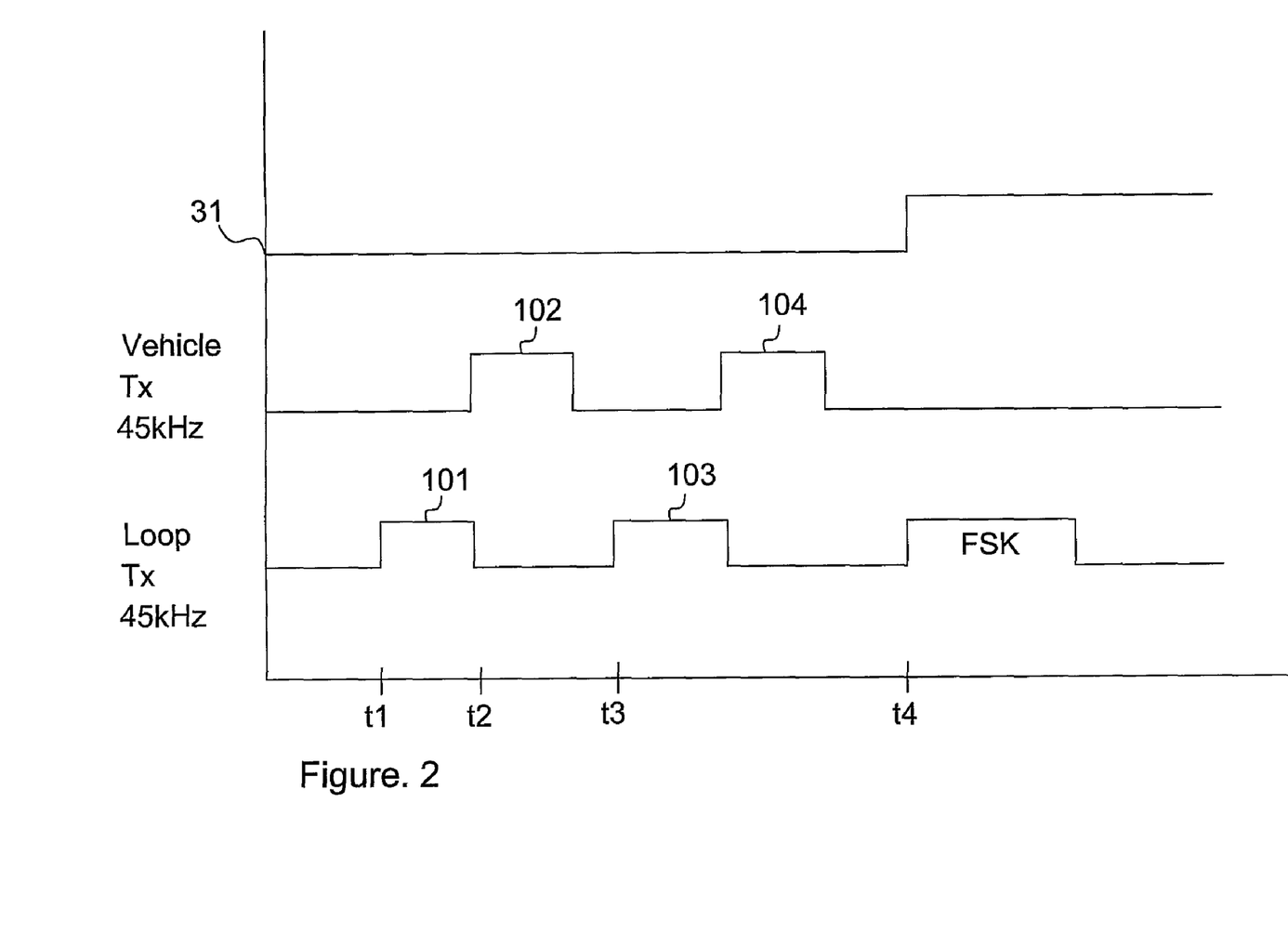
FIG. 2 is a timing diagram illustrating in greater detail the timing of the transmission of signals in the system of FIG. 1.

Referring to FIG. 2, a burst of 45 kHz sinusoidal signal begins at time t1 and continues to time t2 (about 1.5 ms). There is then a 3 ms wait period during which transceiver 25 is in receive mode for receiving a reflected signal 102 from a transformer 41a or 41b on the vehicle. Whether or not such a reflected signal is received, the process is repeated with a second burst 103 at time t3 and the transceiver 25 waits for a second response 104 from the vehicle. If both return bursts 102 and 104 are received by the transceiver 25, it raises its vehicle present signal 31 from low to high (shown at time t4). This indicates to the upstream loop 20a that there is a vehicle present in loop 20b.

Continuing with loop 22, if there is no loop present signal received on line 30 from downstream transceiver 26, transceiver 25 generates a frequency shift key (FSK) code signal 110 of about 8 bits, and this is transmitted through loop 22. If line 31 is high, this indicates the presence of a vehicle in the downstream block, and no such FSK signal is transmitted.

The FSK signal transmitted is common to all vehicles and all loops (but is unique to the system). It serves to provide a signal that is clearly distinguished from background noise.

The transmission-free period between bursts 101 and 103 is used to ensure that no signal is present, thus distinguishing between noise and a genuine vehicle signal (i.e. no signal between bursts). If, therefore, burst 102 received at transceiver 25 does not end before time t3, an error signal is generated and the process begins again at time t1.

The transponders 41a and 41b on the vehicle are tuned resonant inductive and capacitive parallel circuits. The provision of two such circuits has the benefit of reducing the risk of circuit failure, as each transponder is completely passive. The receiver 42 on the vehicle has separate tuned antennae (not shown), tuned to 65 kHz and 85 kHz, representing a logic 0 and logic 1 respectively. These signals are demodulated, amplified and filtered at the receiver 42 and are then compared to a reference code stored in a PIC based micro-controller on the vehicle. If the code matches, the vehicle is allowed to proceed. If the code fails to match or is not received at all, then a signal is applied to the motor controller to stop the vehicle.

Figure 3:
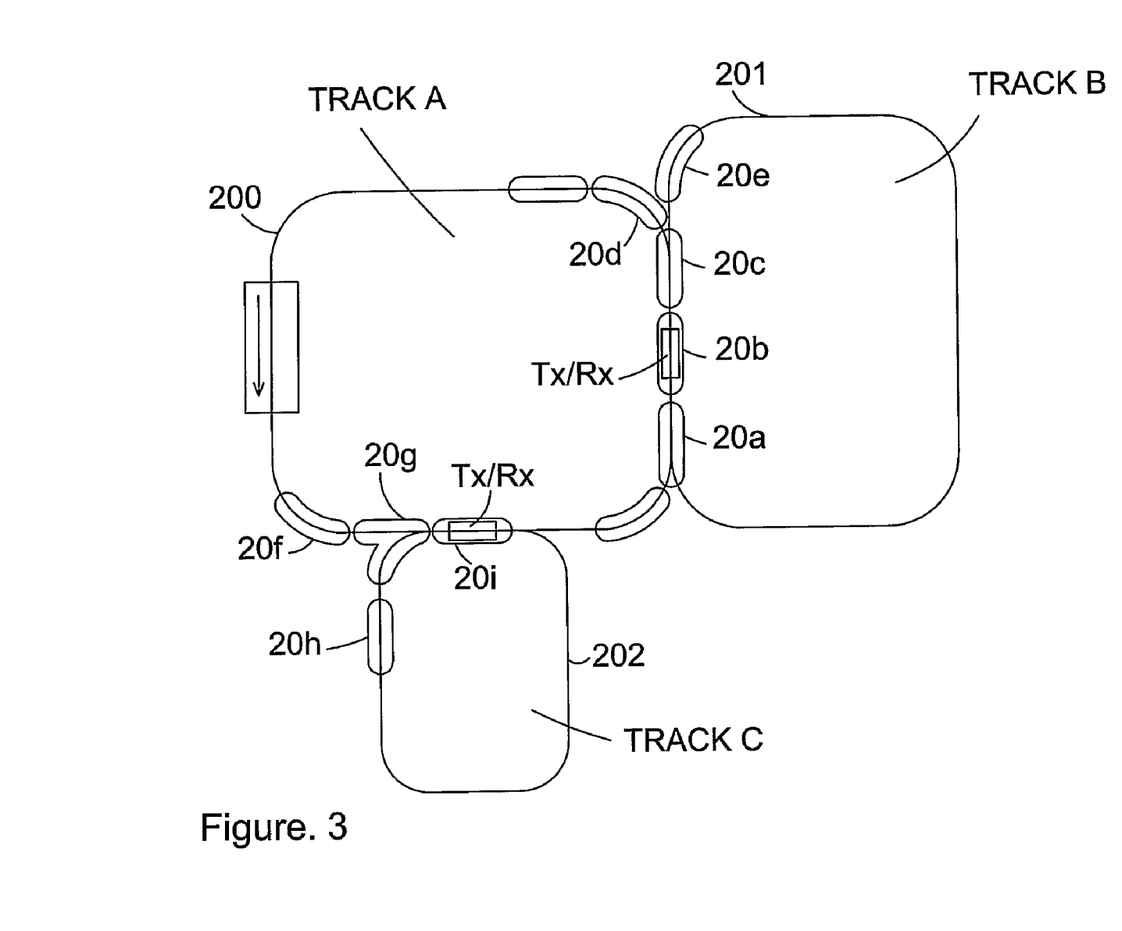
FIG. 3 shows a number of intersecting AGV tracks or guideways on which the arrangement of FIG. 1 can be used.

Referring to FIG. 3, three track loops are shown 200, 201 and 202. There are points are which the tracks converge and separate. The sections of guideway 20a, 20b and 20c are illustrated in this example as being sections of guideways that are common to two tracks (track A and track B). Equally, the arrangement can be applied where adjacent sections of guideway served by adjacent loops span a junction. For example, blocks 20c, 20d and 30e span a junction. In this situation, each of blocks 20d and 20e may provide a vehicle present signal to block 20c.

Alternatively, a loop may entirely surround a junction, as shown by block 20g. In this case, block 20g will provide a "loop empty" signal to block 20f and to block 20h, while block 20g will receive a "loop empty" signal from block 20i.

Figure 4:
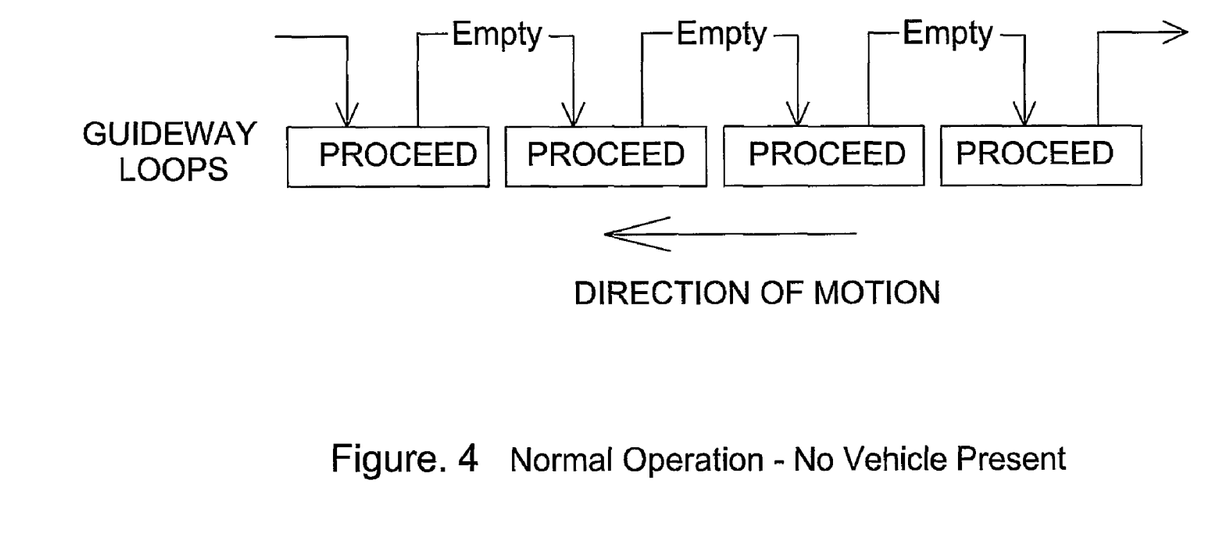
FIGS. 4 and 5 illustrate normal operation with no vehicle present and with a vehicle present, respectively.
Figure 5:
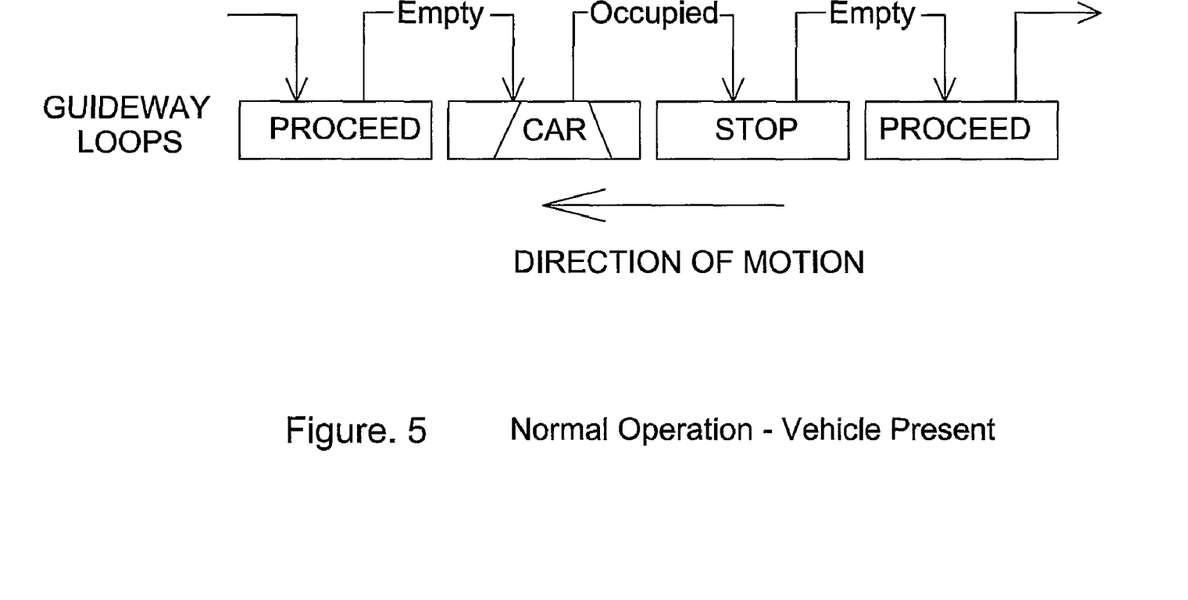

Referring to FIGS. 4 and 5, each block is capable of detecting the presence of a vehicle within that block and transmitting its presence to a small number of following blocks (not limited to just the next upstream block, but possibly also to one or more blocks beyond that). Each block is also capable of receiving vehicle presence signals from those neighbouring blocks in front, whose occupancy determines if a collision is possible if the vehicle proceeds through that block. Guideway loops are present when junctions join the main guideway, thus inhabiting vehicles attempting to join unoccupied intersection.

If one of the dual redundant transponders stops working and the vehicle stops with the remaining working unit positioned in the gap between the loop ends, there is a risk the system may not detect the vehicle presence. A solution to this problem is to slightly overlap the ends of the coils 21 and 22 (and 22 and 23).

There is preferably synchronous clocking between the respective transceivers 24, 25, 26 etc. I.e. all t1 for one transceiver is synchronized with t1 for all other transceivers using a master clock. All transceivers send their initial bursts of a cycle at the same time.

If the vehicle were to drift, after losing control or in a wider corner section, to one side of the track and the center mounted transponders moved outside the coil 15 width there is a risk the vehicle could again be undetected. A way of solving this is to increase the number of transponders. E.g. two transponders may be mounted at the front of the vehicle and two at the rear. Instead of pointing downwards, each transponder can elevated by 30°. Tests show that with two transponders mounted at the loop width (30 cm), and sloping outwards from the top down, the detection width is increased from 30 cm to 45 cm.

Various alternatives to the above described embodiment may be envisaged.

In one embodiment, the lengths of the loops vary along the guideway 20, each length being approximately proportional to the expected operating speed of the vehicle at the part of the guideway where the loop is located. Thus at regions of the guideway 20 where the vehicle is expected to be travelling relatively quickly, for example at straight regions, the loop lengths are longer than they are at regions of the guideway 20 where the vehicle is expected to be travelling more slowly, for example at bends. As an example, at a maximum speed on the straight, the loops are 22 m in length and at the slowest point 1 m, with varying lengths in between.

As an alternative to the passive transponders 41a and 41b, active transponders may instead be used, each comprising a simple active transmitter and receiver arrangement.

Each guideway transceiver may be provided with an analogue digital controller rather than a (PIC) microcontroller thereby removing the need for software. It is envisaged that this may help meet the safety integrity standards required of automated vehicle guidance systems.

In the embodiment described with respect to FIG. 1, the guideway 20 comprises a single arrangement of coils 21, 22 etc. In the alternative embodiment illustrated in FIG. 6, the guideway 20 comprises a first arrangement of coils (of which coils 21 and 22 are illustrated) and a separate second arrangement of coils (of which coils 21' and 22') are illustrated. The first arrangement of coils and the second arrangement of coils are staggered with respect to each other such that the opposing ends of adjacent coils in one of the arrangements (for example coils 21 and 22 in the first arrangement) are overlapped by a respective coil in the other of the arrangements (continuing the example, coil 21' in the second arrangement). Both the first arrangement of coils and the second arrangement of coils operate identically to the coil arrangement described with respect to FIG. 1. In operation, one of the first and second arrangements of coils is an active arrangement whilst the other arrangement is deactive (or redundant) and serves as a back up to the active arrangement. If a failure is detected (or suspected in the active arrangement) the active arrangement can be closed down and the backup coil arrangement activated. In this way the system can continue to operate safely.

Figure 6:
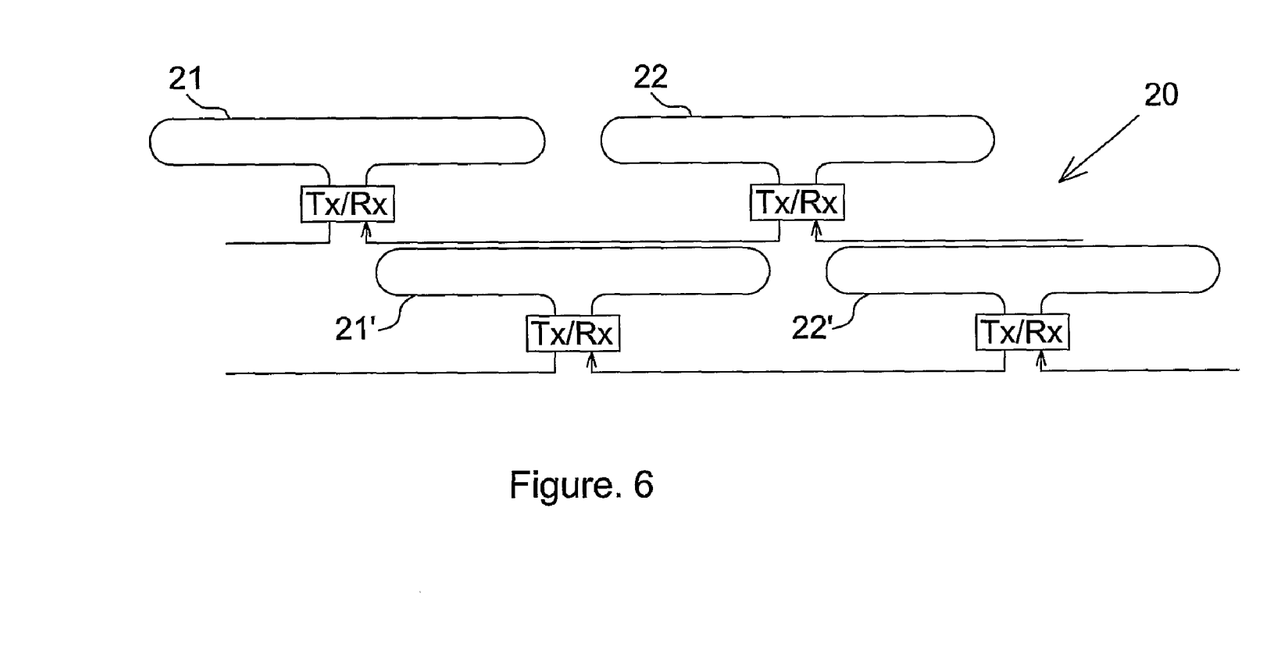
FIG. 6 schematically illustrates an embodiment having a first arrangement of coils and a second arrangement of coils.

Alternatively, the first and second arrangement of coils may both be active simultaneously so that each coil in each arrangement is capable of detecting the presence of a vehicle and transmitting this presence to upstream coils in its respective coil arrangement. Again, if one of the first and second coil arrangements should fail the continued operating of the other coil arrangement means that the system can continue to operate safely. This arrangement also mitigates the problem discussed above with respect to FIG. 1 of the risk of non-vehicle detection should one of the dual redundant transponders be not working when the vehicle has stopped with the remaining working unit positioned in the gap between loop ends. If, for example, a vehicle stops having a remaining working unit positioned above the gap between coils 21 and 22 in the first coil arrangement, vehicle presence will still be detected by coil 21' in the second coil arrangement. Coil 21' will then transmit a vehicle present signal to at least the next upstream coil in the second coil arrangement to halt any following vehicle passing into the next upstream coil prior to a collision. The signals transmitted by the first and second coil arrangements may be at different frequencies so that vehicles can distinguish between them.

Modifications of the invention can be made by one skilled in the art without departing from the scope of the invention.

The invention claimed is:

1. An automated vehicle protection system comprising:
   a guideway for guiding a vehicle along a path, the guideway comprising a first section and a second section;
   a vehicle to be guided along the path;
   a first guideway loop antenna associated with the first section of the guideway for transmitting and receiving signals to and from the vehicle;
   a second guideway loop antenna associated with the second section of the guideway for transmitting and receiving signals to and from the vehicle, wherein the first and second guideway loop antennae are configured in a series arrangement;
   a transceiver coupled to the first guideway loop antenna for receiving a signal from the vehicle and selectively generating an inhibit signal in response thereto, to inhibit vehicle movement in the second section of the guideway; and
   a transponder mounted on the vehicle for receiving a signal from the guideway loop antenna and transmitting a response to the guideway loop antenna.

2. A system according to claim 1, wherein a sinusoidal signal generator is provided, coupled to the first guideway loop antenna, for causing the antenna to transmit a sinusoidal radio signal.

3. A system according to claim 1, wherein a sinusoidal signal receiver is provided in the vehicle for receiving a sinusoidal radio frequency signal from the first guideway loop antenna and automatically transmitting a response thereto.

4. A system according to claim 1, wherein the inhibit signal is passed to a circuit associated with a second guideway loop antenna to control transmission of a signal from the second guideway loop antenna.

5. A system according to claim 4, wherein the first and second guideway loop antennae are elongate and extend along first and second adjacent sections of the guideway.

6. A system according to claim 1, further comprising a code transmitter associated with the guideway loop antenna for selectively transmitting a code to the vehicle depending on the presence or absence of an inhibit signal from an adjacent guideway section.

7. A system according to claim 1, further comprising a code receiver for receiving a code from one of the guideway loop antennas and a controller to cause the vehicle to move along its guideway dependent on a code received.

8. A system according to claim 1, wherein the first and second guideway loop antennae are part of a first antennae series arrangement, the system further comprising a second antennae series arrangement distinct from the first antennae series arrangement, the second antennae series arrangement comprising a third guideway loop antenna and a fourth guideway loop antenna, wherein the third guideway loop antenna is for transmitting and receiving signals to and from the vehicle, and the system further comprising:

a transceiver coupled to the third guideway loop antenna for receiving a signal from the vehicle generated by the vehicle in response to a signal transmitted by the third guideway loop antenna and generating a second signal in response thereto, to inhibit vehicle movement in a section of the guideway, and wherein the second inhibit signal is passed to a second circuit associated with the fourth guideway loop antenna to control transmission of a signal from the fourth guideway loop antenna.

9. A system according to claim 8 wherein in use the first antennae series arrangement is an active arrangement and the second antennae series arrangement is a standby arrangement that can be activated if a failure of the second antennae arrangement is detected.

10. A system according to claim 8 wherein the first and second antennae series arrangement are operational at the same time.

11. A system according to claim 8 wherein the third guideway loop antenna overlaps the first and second guideway loop antennae.

* * * * *